United States Patent Office 3,836,592
Patented Sept. 17, 1974

3,836,592
ISOMERIZATION OF 1,2-DICHLORO-3-BUTENE TO 1,4-DICHLORO-2-BUTENE
Ronnie D. Gordon, Ponca City, Okla., assignor to Continental Oil Company, Ponca City, Okla.
No Drawing. Filed Apr. 6, 1971, Ser. No. 131,771
Int. Cl. C07c 21/04
U.S. Cl. 260—654 R                                    6 Claims

ABSTRACT OF THE DISCLOSURE 1,2-dichloro - 3-butene (3,4-dichloro-1-butene) is isomerized to 1,4-dichloro-2-butene in the presence of an organic quaternary salt catalyst.

BACKGROUND OF THE INVENTION

Field of the Invention

The present invention relates to the production of 1,4-dichloro-2-butene. In one aspect the present invention relates to a process for isomerization of 1,2-dichloro-3-butene (or as otherwise named, 3,4-dichloro-1-butene) to 1,4-dichloro-2-butene. In yet another aspect the present invention relates to the production of 1,4-dichloro-2-butene by allylic rearrangement of 1,2-dichloro-3-butene using an organic quaternary salt catalyst.

Brief Description of the Prior Art 1,4-dichloro-2-butene and 1,2-dichloro - 3 - butene are products generally formed by the chlorination of butadiene. 1,4-dichloro-2-butene is an important intermediate in the preparation of adipic acid, butenediol, and other valuable products. In addition, owing to the readiness with which the chlorine atoms of 1,4-dichloro-2-butene can be exchanged great industrial interest has developed in this isomeric product because of the synthetic organic chemicals which one can produce from such an intermediate.

Attempts have been made heretofore to provide processes wherein the isomeric products resulting from the chlorination of butadiene can be converted into a single relatively pure compound. For example, many processes have been proposed for the isomerization of 1,2-dichloro-3-butene to 1,4-dichloro-2-butene, such as the use of condensation and polymerization catalyst. Examples of such catalysts are $FeCl_3$, $TiCl_2$, and $AlCl_3$. However, when employing such catalysts elaborate precautions have had to be taken in order to avoid undesirable side reactions such as the polymerization or condensation of the unsaturated organic chlorides. Further, the procedures employing such metallic halide condensing agents have suffered from the disadvantage of low yields due to the occurence of extensive dehydrochlorination and degradative side reactions.

Other prior art processes have proposed that the transposition to the dichloro-2-butene be carried out in the absence of catalysts at elevated temperatures. However, the prolonged heating necessary to obtain the conversion to the desired isomer has also lead to excessive dehydrochlorination and undesired side reactions.

In efforts to overcome these problems of excessive dehydrochlorination and degradative side reactions other processes have been proposed by the prior art which call for exotic catalyst systems such as zirconium fluoride catalysts and the like. However, when employing such catalysts the conversion of the isomeric products to the desired isomer has not attained the degree sought and required. Therefore, new and novel processes are constantly being sought which will allow the production of a desired isomer from the isomeric mixture of dichlorobutene produced by chlorination of butadiene. It is especially desirable that a process be developed for the allylic rearrangement of 1,2-dichloro-3-butene to 1,4-dichloro-2-butene.

OBJECTS OF THE INVENTION

An object of the invention is to provide an improved process for producing 1,4-dichloro-2-butene.

Another object of the present invention is to provide an improved process for the allylic rearrangement of 1,2-dichloro-3-butene to 1,4-dichloro-2-butene.

Another object of the present invention is to provide a process for producing 1,4-dichloro-2-butene which does not suffer from the disadvantage of the prior art and which is highly selective to the production of 1,4-dichloro-2-butene at yields of commercial significance.

These and other objects, advantages, and features of the present invention will be apparent to those skilled in the art from a reading of the following description.

SUMMARY OF THE INVENTION

In accordance with the present invention, it has been found that organic quaternary salt catalysts have the property of catalyzing the allylic rearrangement of 1,2-dichloro-3-butene to 1,4-dichloro-2-butene so as to effect formation of the desired product in high yields, with ultimate selectivity, while maintaining at a minimum the formation of undesired by-products.

Further, according to the invention a novel process is provided for the allylic rearrangement of 1,2-dichloro-3-butene to 1,4-dichloro-2-butene wherein the 1,2-dichloro-3-butene is heated at a temperature in the range of about 25 degrees C. to about 200 degrees C. in the presence of a catalytic amount of an organic quaternary phosphonium salt catalyst for an effective period of time to allow said allylic rearrangement.

DESCRIPTION OF THE PREFERRED EMBODIMENTS

Organic quaternary salt catalysts, such as those disclosed in the copending patent application of Charles M. Starks and Donald R. Napier entitled "Phase Transfer Catalysis of Heterogeneous Reactions by Quaternary Salts," filed Nov. 22, 1968, and having Ser. No. 778,324, and now abandoned, can be employed for the allylic rearrangement 1,2-dichloro-3-butene to 1,4-dichloro-2-butene.

The organic quaternary salt catalysts which can be employed in the allylic rearrangement of 1,2-dichloro-3-butene to 1,4-dichloro-2-butene are generally represented by the general formula

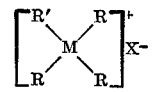

wherein M is a pentavalent ion derived from an element of Group VA of the periodic table; X is an anion which will dissociate from the cation portion of the molecule in an aqueous environment; R is an alkyl radical having from 1 to about 20 carbon atoms; and R' is chosen from the group consisting of (a) single ring aromatic radicals,
(b) alkyl radicals having from 1 to about 20 carbon atoms, and
(c) an alkyl substituted single ring aromatic radical wherein the alkyl constituent contains from 1 to about 20 carbon atoms.

while the total number of carbon atoms in the R and R' constituent of the above-described quaternary salt can very widely, the total number of carbon atoms in R and R' should be at least 18 and preferably from about 28 to 40. In addition, it is generally desired that the hydrocarbon constituents, R and R' contain more than a single carbon atom.

The pentavalent ion derived from an element of Group VA which can be employed in the organic quaternary salt catalyst defined above is selected from the group consisting of nitrogen, phosphorus, arsenic, antimony and bismuth. However, especially desirable results have been obtained where the pentavalent ion is phosphorus. As previously stated, the anion constituent employed in the organic quaternary salt catalyst can vary widely but is generally selected from the group consisting of halogens, sulfates, citrates, acetates, hydroxides, and adipates. Desirable results have been obtained where the anion constituent is a halogen, with bromine being the most desirable of the halogens. In addition, mixtures of such organic quaternary salts may be utilized as the catalyst in the process of the present invention. It should be further pointed out that double or multifunctional quaternary salts in which the general formula as set out hereinabove is repeated a plurality of times can also be utilized effectively. An example of this type of compound is N,N,N',N' - tetramethyl-N,N'-dioctadecyl-x-dodecyl-y-xylene-α,α'-diphosphonium dibromide which has the general formula

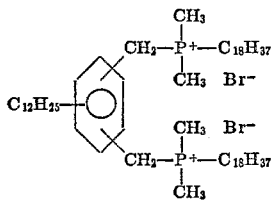

Examples of organic quaternary salt catalysts which can be employed in the present invention are:

hexadecyltrihexylammonium bromide;
trioctylethylammonium bromide;
tridecylmethylammonium chloride;
didodecyldimethylammonium chloride;
tetraheptylammonium iodide;
dioctadecyldimethylammonium chloride;
tridecylbenzylammonium chloride;
ditricosylmethylammonium chloride;
tributyldecylphosphonium iodide;
triphenyldecylphosphonium iodide;
tributylhexadecylphosphonium iodide;
tricaprylyldodecylammonium p-toluene sulfonate;
tribenzyldecylarsonium chloride;
tetranonylammonium hydroxide;
tritridecylphenylstibonium chloride;
N,N,N',N'-tetramethyl-N,N'-ditetradecyl-p-xylene-α,α'-diammonium dichloride;
1-methyl-1-(N-octadecanoyl-2-amineethyl)-2-heptadecyl-4,5-dihydro-1,3-diazole methylsulfate;
N,N,N',N'-tetramethyl-N,N'-dioctadecyl-x-dodecyl-y-xylene-α,α'-diammonium dichloride;
N,N,N',N'-tetramethyl-N,N'-dioctadecyl-1,1,2-ethyl-diammonium dibromide;
N,N'-dimethyl-N,N,N',N'-tetraheptadecyl-2-butene-1,4-diammonium chloride.

The amount of the organic quaternary salt catalyst employed for the allylic rearrangement of 1,2-dichloro-3-butene to 1,4-dichloro-2-butene can vary widely, the only requirement being that a catalytic amount of the organic quaternary salt catalyst be present to allow the allylic rearrangement to occur. Generally the organic quaternary salt catalyst is employed in an amount ranging from about 0.01 to about 10% by weight of the 1,2-dichloro-3-butene. Desirable results have been obtained wherein the amount of the organic quaternary salt catalyst employed is from about 0.1 to about 5% catalyst based on the weight of the 1,2-dichloro-3-butene.

The pressure at which the reaction of the present invention can be carried out can vary widely, generally being in the range of from atmospheric pressure to about 200 p.s.i. Generally, it is desirable that the pressure range be from atmospheric to about 50 p.s.i., with atmospheric pressure being preferred for the sake of convenience. When employing a pressure in the range of from atmospheric to 200 p.s.i. the temperature of the reaction can vary between about 25 degrees C. to about 200 degrees C. However, desirable results have been obtained where the reaction is carried out at a temperature in the range of about 90 degrees C. to about 150 degrees C. and pressure is within the range of from atmospheric to about 50 p.s.i.

The duration of the reaction will also vary widely depending upon the amount of catalyst employed, as well as the reaction conditions. Generally when the reaction is completed one will notice a temperature increase due to the formation of the isomeric product. This increase is due, in part, to the fact that 1,4-dichloro-2-butene has a higher boiling point than the 1,2-dichloro-3-butene. Generally from about 1 to about 8 hours are sufficient for the isomerization to occur. However, additional time will not affect the isomerization product.

The process of the present invention can be carried out employing a batch type process or a continuous type process. In a batch type process 1,2-dichloro-3-butene or a mixture of 1,2-dichloro-3-butene and 1,4-dichloro-2-butene is charged with the organic quaternary salt catalyst to a reaction zone and heated in liquid phase under reflux conditions. Reflux conditions are maintained until substantial conversion of the 1,2-dichloro-3-butene has been affected which is indicated generally by a rise of temperature in the reaction zone. Generally the reaction time will vary from about 1 to 8 hours. The reflux material e.g., 1,4-dichloro-2-butene is then recovered from the reaction zone and separated from the organic quaternary salt catalyst. The product so separated can then be further purified, if desired, by any suitable means such as distillation and the like.

The process of the present invention may also be carried out by feeding the 1,2-dichloro-3-butene or mixture containing same to a reaction zone containing the organic quaternary salt catalyst in suspended form and continuously withdrawing the 1,4-dichloro-2-butene product from the reaction zone. Likewise, the starting material may be constantly percolated downward through a reaction zone packed with the organic quaternary salt catalyst and the 1,4-dichloro-2-butene continuously withdrawn from the base of the reaction zone.

As previously stated, it is desired that the reaction be carried out in the liquid phase. However, as is evident to those skilled in the art, the reaction can be carried out by passing 1,2-dichloro-3-butene in vapor form through a heated tube containing the organic quaternary salt catalyst. However, when employing the vapor phase type reaction one must be careful not to exceed the decomposition temperature of the organic quaternary salt catalyst. In addition, when employing a vapor phase process it may be desirable to admix the 1,2-dichloro-3-butene with an inert diluent gas, such as nitrogen. The exit gases from the heated tube, which will be a mixture of the 1,4-dichloro-2-butene and the inert carrier gas, are passed through a condenser to liquefy the 1,4-dichloro-2-butene and thus separate same from the inert gas. If desired, the condensed product can then be additionally treated such as by fractional distillation and the like to purify the product.

In order to more fully describe the present invention the following example is given. However, it is to be understood that the example is for illustrative purposes only and is not intended to be a limitation on the invention.

EXAMPLE 12.5 g. (0.1 mole) of 1,2-dichloro-3-butene and 0.4 g. of $(C_4H_9)_3PC_{18}H_{32}{}^+Br^-$ were heated under reflux (123 degrees C.) in a 250 ml. flask. The progress of the reaction was followed by gas chromatographic analysis and by noting that the temperature increased to about 140 degrees C. as the reaction neared completion.

After eight hours reaction time, the reaction was essentially complete with 1,4-dichloro-2-butene formation increasing the reflux temperature of the reaction.

1,4-dichloro-2-butene was formed in 92–98% conversion with 99% selectivity.

The above data clearly indicate the isomerization of 1,2-dichloro-3-butene to 1,4-dichloro-2-butene employing the organic quaternary salt catalyst of the present invention. Further, it should be noted that by employing the process of the present invention the conversion of the 1,2-dichloro-3-butene to 1,4-dichloro-2-butene was approximately 95% with a selectivity of such product of about 99%.

In addition, it should be understood that certain changes may be made in carrying out the above process without departing from the scope of the invention and, it is intended that all matter in the above description shall be interpreted as being illustrative and not in a limiting sense.

Having thus described the invention, I claim:

1. A method for converting 1,2-dichloro-3-butene to 1,4-dichloro-2-butene which comprises contacting said 1,2-dichloro-3-butene with a catalytic amount of an organic quaternary salt catalyst of the formula:

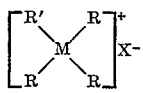

wherein M is a pentavalent ion of an element selected from the group consisting of nitrogen, phosphorous, arsenic, antimony and bismuth; X is an anion selected from the group consisting of halogens, sulfate, nitrate, citrate, acetate, hydroxide, and adipate; R is an alkyl radical having from 1 to 20 carbon atoms; and R' is selected from the group consisting of:

(a) a single ring aromatic hydrocarbon radical,
(b) alkyl radical having from 1 to 20 carbon atoms, and
(c) an alkyl substituted single ring aromatic hydrocarbon radical wherein the alkyl constituent contains 1 to 20 carbon atoms;

at a temperature of 25° C. to 200° C. at a pressure of one atmosphere to 200 p.s.i.

2. The method of Claim 1 wherein said catalyst is present in an amount of 0.01 to 10 weight percent based on the weight of the 1,2-dichloro-3-butene.

3. The method of Claim 2 wherein said 1,2-dichloro-3-butene is contacted with from about 0.1 to 5 weight percent of said catalyst at a temperature in the range of about 90 degrees C. to about 150 degrees C. and at a pressure in the range of atmospheric pressure to about 50 p.s.i.

4. The method of Claim 2 wherein M is phosphorus and X is a halogen.

5. The method of Claim 4 wherein said halogen is bromine.

6. The method of Claim 5 wherein said catalyst is tributyldodecylphosphonium bromide.

References Cited 1,332,045  6/1963  France _____ 260— 654 R

OTHER REFERENCES

Hemmingson et al., J. of the Chemical Society (England), 7, 1348–1352 (1971) QD1C6.

Dewolfe et al., Chemical Reviews, 56, 787 (1956).

LEON ZITVER, Primary Examiner

J. A. BOSKA, Assistant Examiner